US011755198B2

(12) United States Patent
Khan

(10) Patent No.: US 11,755,198 B2
(45) Date of Patent: Sep. 12, 2023

(54) METHOD, SYSTEM AND COMPUTER PROGRAM PRODUCT FOR OPERATING A KEYBOARD

(71) Applicant: TEXAS INSTRUMENTS INCORPORATED, Dallas, TX (US)

(72) Inventor: Sajjad Mahmood Khan, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 214 days.

(21) Appl. No.: 15/257,672

(22) Filed: Sep. 6, 2016

(65) Prior Publication Data

US 2016/0370995 A1 Dec. 22, 2016

Related U.S. Application Data

(63) Continuation of application No. 13/857,276, filed on Apr. 5, 2013, now Pat. No. 9,436,291.

(60) Provisional application No. 61/623,616, filed on Apr. 13, 2012.

(51) Int. Cl.
*G06F 3/04886* (2022.01)
*G06F 3/02* (2006.01)
*G06F 3/01* (2006.01)
*G06F 3/0482* (2013.01)
*G06F 3/04817* (2022.01)

(52) U.S. Cl.
CPC .......... *G06F 3/04886* (2013.01); *G06F 3/018* (2013.01); *G06F 3/02* (2013.01); *G06F 3/0482* (2013.01); *G06F 3/04817* (2013.01)

(58) Field of Classification Search
CPC ................................................... G06F 3/04886
See application file for complete search history.

(56) References Cited

U.S. PATENT DOCUMENTS

| 5,854,997 | A | * | 12/1998 | Sukeda | G06F 40/45 704/7 |
| 5,903,861 | A | * | 5/1999 | Chan | G06F 3/018 715/263 |
| 8,463,592 | B2 | * | 6/2013 | Lu | G06F 40/53 704/2 |
| 8,806,362 | B2 | * | 8/2014 | Ording | G06F 3/04883 345/173 |
| 2006/0123354 | A1 | * | 6/2006 | Volovitz | G06F 3/0236 715/780 |

(Continued)

OTHER PUBLICATIONS

Khaled, A., "Arabic Keyboard in iPad with iOS 4.2 is Flawed," www.saudimac.com/2010/1 1/arabic-keyboard-in-ipad-with-ios-4-2-is-flawed/, Nov. 23, 2010, pp. 1-4, SaudiMac.

*Primary Examiner* — William Boddie
*Assistant Examiner* — Andrew B Schnirel
(74) *Attorney, Agent, or Firm* — Charles F. Koch; Frank D. Cimino

(57) ABSTRACT

In response to a user selecting a key on a keyboard in a first manner, a first alphanumeric character is displayed on a display device. In response to the user selecting the key on the keyboard in a second manner, a virtual key of a diacritic is displayed on the display device. In response to the user selecting the virtual key of the diacritic on the display device, the diacritic is displayed at a location of a second alphanumeric character on the display device.

27 Claims, 5 Drawing Sheets

(56) References Cited

U.S. PATENT DOCUMENTS

| | | | |
|---|---|---|---|
| 2008/0114585 A1* | 5/2008 | Scott | G06F 40/274 704/2 |
| 2008/0300861 A1 | 12/2008 | Emam et al. | |
| 2009/0210214 A1* | 8/2009 | Qian | G06F 16/3337 704/2 |
| 2009/0248392 A1* | 10/2009 | Talwar | H04L 51/063 704/3 |
| 2009/0265669 A1* | 10/2009 | Kida | G06F 3/04886 715/863 |
| 2009/0278804 A1 | 11/2009 | Rubanovich et al. | |
| 2010/0030549 A1* | 2/2010 | Lee | G06F 3/0482 704/4 |
| 2010/0085313 A1* | 4/2010 | Rider | G06F 3/04886 345/173 |
| 2010/0180235 A1 | 7/2010 | Griffin et al. | |
| 2011/0141027 A1* | 6/2011 | Ghassabian | G06F 3/04883 345/173 |
| 2011/0163973 A1* | 7/2011 | Ording | G06F 3/04883 345/173 |
| 2012/0029902 A1* | 2/2012 | Lu | G06F 3/018 704/2 |
| 2012/0109632 A1* | 5/2012 | Sugiura | G10L 15/20 704/3 |
| 2012/0306747 A1* | 12/2012 | Davidson | G06F 3/04895 345/160 |
| 2012/0310622 A1* | 12/2012 | Zivkovic | G06F 40/58 704/E15.043 |
| 2013/0057494 A1* | 3/2013 | Huang | G06F 3/04883 345/173 |
| 2013/0297287 A1* | 11/2013 | Yin | G06F 40/58 704/2 |
| 2014/0043239 A1* | 2/2014 | Agrawal | G06F 3/0236 345/169 |
| 2015/0121286 A1* | 4/2015 | Kim | G06F 3/04842 715/773 |
| 2015/0370786 A1* | 12/2015 | Kwon | G06F 3/017 704/2 |
| 2016/0259781 A1* | 9/2016 | Nuggehalli | G06F 40/45 |
| 2017/0351665 A1* | 12/2017 | Kim | H04M 1/72469 |
| 2018/0357223 A1* | 12/2018 | Kim | G06F 16/00 |

\* cited by examiner

METHOD, SYSTEM AND COMPUTER PROGRAM PRODUCT FOR OPERATING A KEYBOARD

CROSS-REFERENCE TO RELATED APPLICATIONS

This application is a continuation of U.S. patent application Ser. No. 13/857,276 filed Apr. 5, 2013, which claims priority to U.S. Provisional Patent Application Ser. No. 61/623,616 filed Apr. 13, 2012. All of the above-identified applications are hereby fully incorporated herein by reference for all purposes.

BACKGROUND

The disclosures herein relate in general to information handling systems, and in particular to a method, system and computer program product for operating a keyboard.

For composing and revising (e.g., typing) Arabic letters on an electronics device, a conventional user interface may be relatively cumbersome. Such interface may be even more cumbersome for composing and revising multilingual combinations of alphanumeric characters on the electronics device, such as combinations of Latin letters, other Latin characters (e.g., numbers), Arabic letters and other Arabic characters.

SUMMARY

In response to a user selecting a key on a keyboard in a first manner, a first alphanumeric character is displayed on a display device. In response to the user selecting the key on the keyboard in a second manner, a virtual key of a diacritic is displayed on the display device. In response to the user selecting the virtual key of the diacritic on the display device, the diacritic is displayed at a location of a second alphanumeric character on the display device.

DETAILED DESCRIPTION

Figure 1:
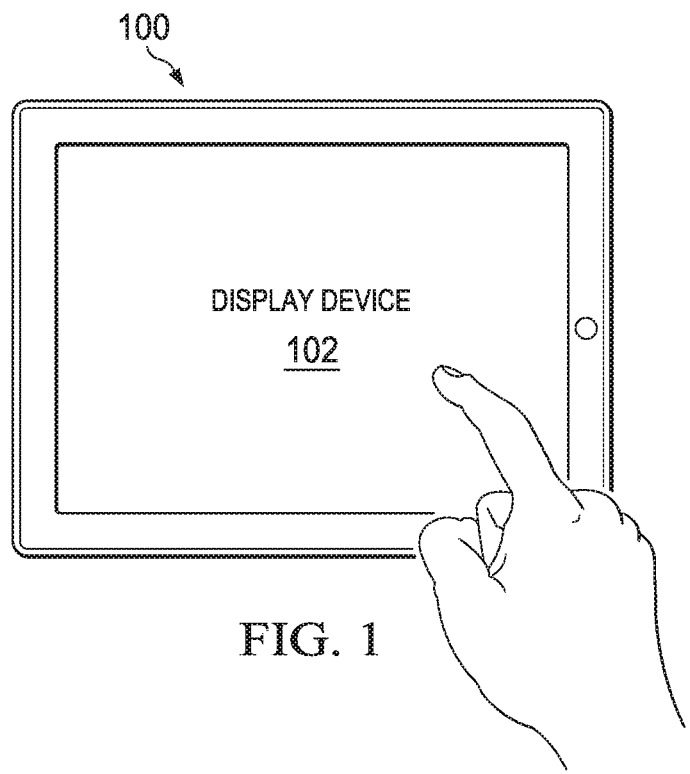
FIG. 1 is a top view of an information handling system of the illustrative embodiments.

FIG. 1 is a top view of an information handling system (e.g., a portable handheld electronics device, such as a tablet computing device, a mobile smartphone, a netbook computer, a laptop computer, or a graphing calculator), indicated generally at 100, of the illustrative embodiments. Accordingly, the system 100 executes various processes and performs operations (e.g., processing, displaying and otherwise communicating information) in response thereto. The system 100 includes a display device 102 for displaying and receiving information.

Figure 2:
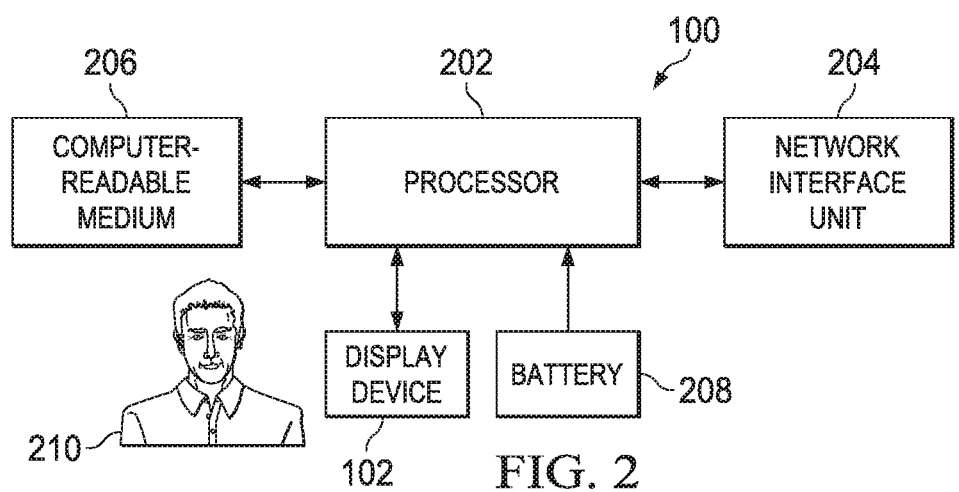
FIG. 2 is a block diagram of the system of FIG. 1.

FIG. 2 is a block diagram of the system 100. The system 100 includes various electronic circuitry components for performing the system 100 operations, implemented in a suitable combination of software, firmware and hardware. Such components include: (a) a processor 202, which is a general purpose computational resource for executing instructions of computer-readable software programs to process data (e.g., a database of information) and perform additional operations (e.g., communicating information) in response thereto; (b) a network interface unit 204 for communicating information to and from a network; (c) a computer-readable medium 206 for storing information, such as a nonvolatile storage device and/or a random access memory ("RAM") device; (d) a battery 208, which is a source of power for the system 100; (e) the display device 102 for displaying information to a human user 210 and for receiving information from the user 210; and (f) other electronic circuitry for performing additional operations. In the illustrative embodiments, the various electronic circuitry components of the system 100 are housed integrally with one another.

Accordingly, the system 100 performs its operations in response to instructions of computer-readable software programs, which are stored on the computer-readable medium 206. Such programs include, but are not limited to: (a) applications, such as applications for word processing, calculator, data collection, lists, statistics, graphing, geometry, querying, polling (e.g., quick polling), and various other functions; (b) a window, dialog and event manager; (c) a settings manager; (d) a power manager; (e) a communication stack; (f) a display driver; (g) a touchpad driver; (h) a universal serial bus ("USB") interface driver; (i) a wireless interface driver; and (j) boot code. Also, the computer-readable medium 206 stores data that are processed by the processor 202, in response to the processor 202 executing such programs.

As shown in FIG. 1, the processor 202 is connected to the display device 102, the computer-readable medium 206, and the battery 208. For clarity, although FIG. 1 shows the battery 208 connected to only the processor 202, the battery 208 is further coupled to various other components of the system 100. Also, the processor 202 is coupled through the network interface unit 204 to the network (not shown in FIG. 1), such as a Transport Control Protocol/Internet Protocol ("TCP/IP") network (e.g., the Internet or an intranet). For example, the network interface unit 204 communicates information by outputting information to, and receiving information from, the processor 202 and the network, such as by transferring information (e.g. instructions, data, signals) between the processor 202 and the network (e.g., wirelessly or through a USB interface).

The system 100 operates in association with the user 210. In response to signals from the processor 202, the display device 102 displays visual images, which represent information, so that the user 210 is thereby enabled to view the visual images. Also, in the illustrative embodiments, the display device 102 is a touchscreen, such as: (a) a liquid crystal display ("LCD") device; and (b) touch-sensitive circuitry of such LCD device, so that the touch-sensitive circuitry is integral with such LCD device. Accordingly, the user 210 operates the display device 102 (e.g., virtual keys thereof, such as a virtual keyboard and/or virtual keypad) for specifying information (e.g., alphanumeric text information) to the processor 202, which receives such information from the display device 102.

For example, referring also to FIG. 1, the display device 102: (a) detects presence and location of a physical touch (e.g., by a finger of the user 210, and/or by a passive stylus object) within a display area of such touchscreen; and (b) in response thereto, outputs signals (indicative of such detected presence and location) to the processor 202. In that manner, the user 210 can physically touch (e.g., single tap, double tap, and/or press-and-hold) the display device 102 to: (a) select a portion (e.g., region) of a visual image that is then-currently displayed by the display device 102; and/or (b) cause the display device 102 to output various information to the processor 202. Accordingly: (a) the processor 202 executes a computer-readable software program; (b) such program is stored on the computer-readable medium 206; and (c) in response to instructions of such program, and in response to such physical touch, the processor 202 causes the display device 102 to display various screens.

Figure 3:
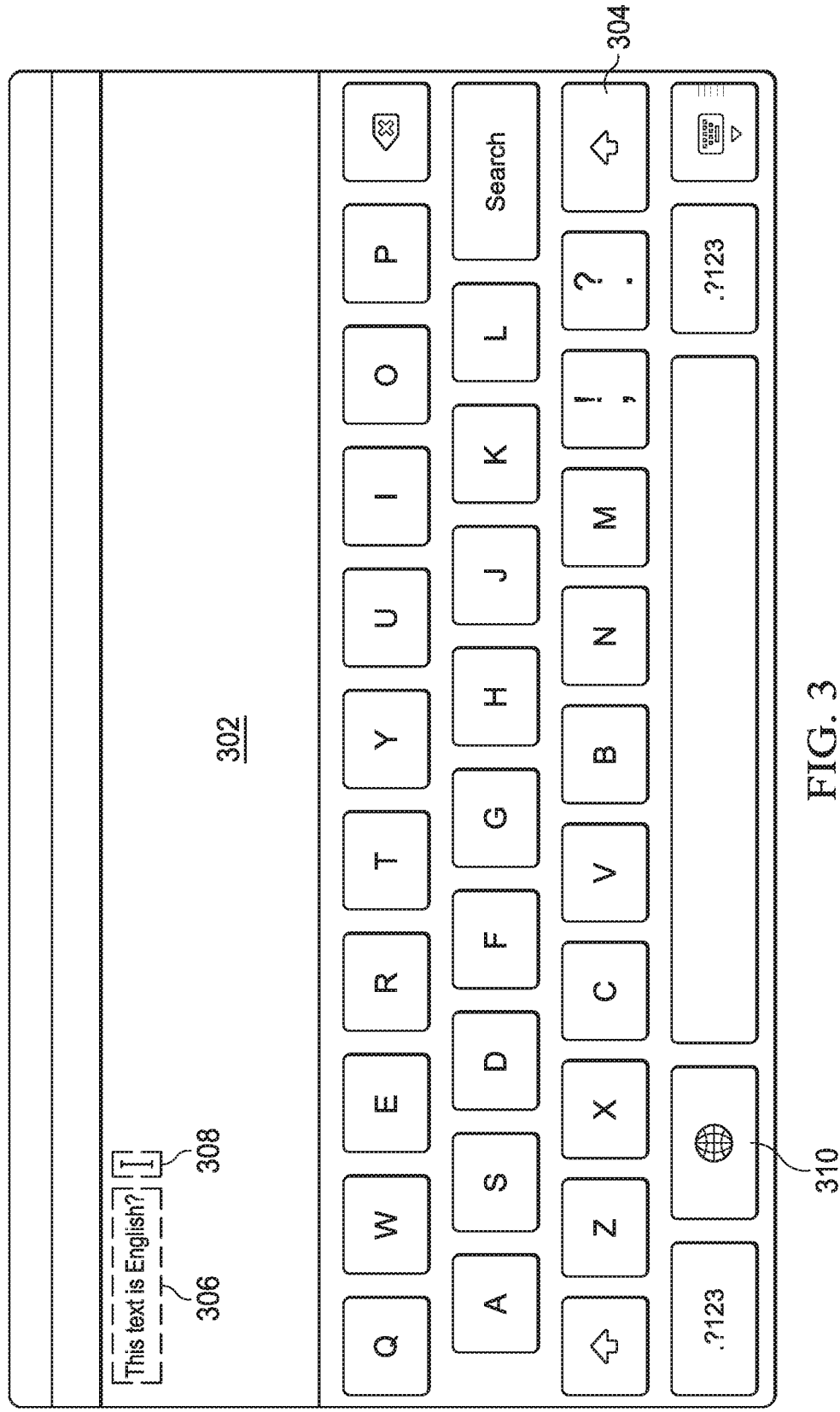
FIG. 3 is a diagram of a first example screen that is displayed by a display device of the system of FIG. 1.

FIG. 3 is a diagram of a first example screen that is displayed by the display device 102. In the example of FIG. 3: (a) the user 210 has physically touched (e.g., single tapped) a text portion 302 on the display device 102; and (b) in response thereto, the processor 202 has caused the display device 102 to display a set of keys (e.g., a virtual keyboard) 304 associated with the selected text portion 302 for viewing (on the display device 102) by the user 210. The keys 304 (e.g., QWERTY keys) are suitable for the user 210 to operate (e.g., physically touch with single tap, double tap, and/or press-and-hold) in composing and revising (e.g., typing) alphanumeric text information 306 at a location of a cursor 308 within the text portion 302.

In one example, the processor 202 causes the display device 102 to position the cursor 308 in response to a command from the user 210, such as in response to: (a) the user 210 physically touching the text portion 302 on the display device 102, so that the cursor 308 is positioned at a location of such physical touch; or (b) the user 210 operating a pointing device (e.g., mouse or stylus), so that the cursor 308 is positioned at a location specified by such pointing device. In response to the user 210 selecting (e.g., single tapping) one of the keys 304, the system 100 performs a respective operation associated with the selected key. In that manner, the user 210 operates the keys 304 for specifying information to the processor 202, which: (a) receives such information from the display device 102; and (b) in response thereto, causes the display device 102 to update the displayed screen in accordance with such information, and causes the computer-readable medium 206 to store a record of such update.

Figure 4:
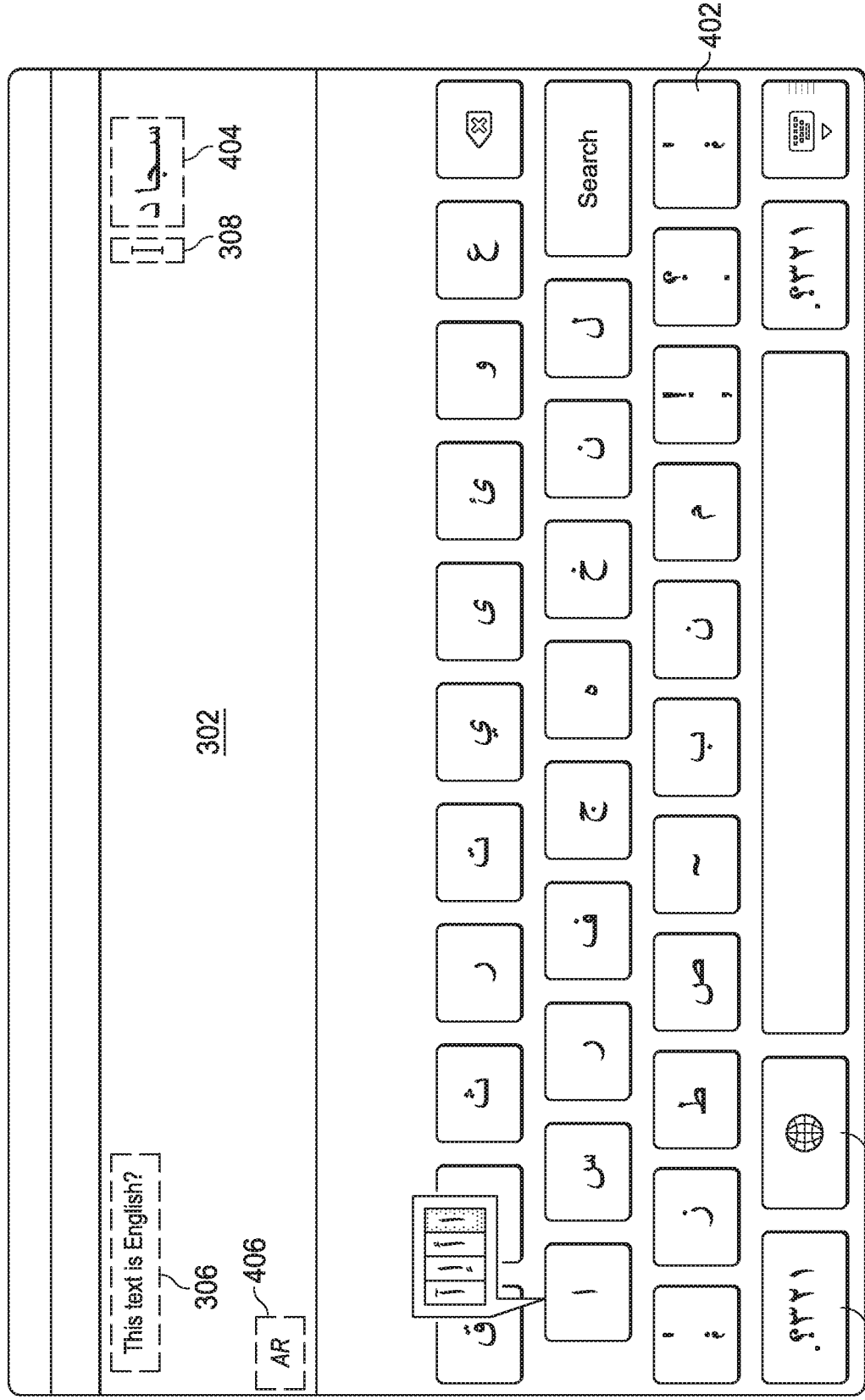
FIG. 4 is a diagram of a second example screen that is displayed by the display device of the system of FIG. 1.

FIG. 4 is a diagram of a second example screen that is displayed by the display device 102. In the example of FIG. 4: (a) the user 210 has selected (e.g., single tapped) a special purpose key 310 within the keys 304 (FIG. 3) on the display device 102; and (b) in response thereto, the processor 202 has caused the display device 102 to display an alternative set of keys (e.g., an alternative virtual keyboard) 402 associated with the selected text portion 302 for viewing (on the display device 102) by the user 210, instead of displaying the set of keys 304. The keys 402 are suitable for the user 210 to operate in composing and revising alphanumeric text information 404 at the location of the cursor 308 within the text portion 302. In this example, the alphanumeric text information 404 includes Arabic letters and other Arabic characters (composed in a right-to-left order and revised by the user 210 suitably operating the keys 402), while the alphanumeric text information 306 includes Latin letters and other Latin characters (composed in a left-to-right order and revised by the user 210 suitably operating the keys 304).

As shown in FIGS. 3 and 4, and in the first and second rows of Tables 1 and 2, each Arabic letter has a respective location (within the keys 402) that aligns with a respective location (within the keys 304) of such Arabic letter's phonetically similar Latin letter. For example: (a) the Arabic letter Ba ( ب ) has a respective location (within the keys 402) that aligns with a respective location (within the keys 304) of the Latin letter B; and (b) the Arabic letter Fa ( ف ) has a respective location (within the keys 402) that aligns with a respective location (within the keys 304) of the Latin letter F. In that manner, the system 100 helps the user 210 to learn similarities (e.g., in pronunciation) between Latin letters and their phonetically similar Arabic letters.

TABLE 1

Phonetic Mapping between Latin Letters
(A through N) and Arabic Letters

| A | B | C | D | E | F | G | H | I | J | K | L | M | N |
|---|---|---|---|---|---|---|---|---|---|---|---|---|---|
| ا | ب | ص | د | ث | ف | ج | ه | ي | غ | خ | ك | ل | ن |
| إ |   | ض | ذ |   |   | ح |   | ئ |   |   |   |   |   |

TABLE 2

Phonetic Mapping between Latin Letters (O through Z) and Arabic Letters

| O | P | Q | R | S | T | U | V | W | X | Y | Z |
|---|---|---|---|---|---|---|---|---|---|---|---|
| و | ع | ق | ر | س | ت | ى | ~ | ؤ | ط | ي | ز |
|   | غ |   |   | ش | ة |   |   |   | ظ |   |   |

As shown in the third rows of Tables 1 and 2, the system 100 associates some Arabic letters (within the keys 402) with related Arabic letters. For example, the system 100 associates: (a) the Arabic letter ا with the related Arabic letters آ , أ and إ ; (b) the Arabic letter ص with the related Arabic letter ض ; (c) the Arabic letter د with the related Arabic letter ذ (d) the Arabic letter س with the related Arabic letter ش ; and (e) the Arabic letter ط with the related Arabic letter ظ . In that manner, the system 100 helps the user 210 to learn similarities between an Arabic letter and its related Arabic letter(s).

In response to the user 210 pressing-and-holding one of the Arabic letters (within the keys 402) that the system 100 associates with one or more related Arabic letters, the processor 202 causes the display device 102 to display virtual key(s) of such related Arabic letter(s), so that such display is viewable by the user 210 with more efficiency and comfort (instead of displaying all of the related Arabic letters from the third rows of Tables 1 and 2 simultaneously with one another). In the example of FIG. 4: (a) the user 210 has pressed-and-held the Arabic letter ا key on the display device 102; and (b) in response thereto, the processor 202 has caused the display device 102 to display (adjacent to the Arabic letter ا key) virtual keys of the related Arabic letters آ , أ and إ for viewing (on the display device 102) by the user 210. The user 210 is able to select (e.g., single tap) any of the keys 402, including any displayed virtual key(s) of such related Arabic letter(s). In response to such selection by the user 210, the processor 202 causes the display device 102 to display the selected key's Arabic letter at the location of the cursor 308 within the text portion 302.

As shown in FIGS. 3 and 4, the processor 202 causes the display device 102 to display the special purpose key 310 within the keys 304 and within the keys 402. In response to the user 210 selecting (e.g., single tapping) the special purpose key 310 within the keys 402 (FIG. 4) on the display device 102, the processor 202 causes the display device 102 to again display the set of keys 304 (FIG. 3) for viewing (on the display device 102) by the user 210, instead of displaying the set of keys 402. Accordingly, by repeatedly selecting the special purpose key 310, the user 210 causes the display device 102 to alternate between displaying either the set of keys 304 or the set of keys 402 for viewing (on the display device 102) by the user 210, while continuing to display (within the text portion 302) the alphanumeric text information 306 and 404 irrespective of such repeated selection. In that manner: (a) by alternating between the sets of keys 304 and 402, those keys are suitable for the user 210 to operate in composing and revising multilingual combinations of Latin letters, other Latin characters, Arabic letters and other Arabic characters; and (b) in response to such operation, the processor 202 causes the display device 102 to simultaneously display such multilingual combinations (e.g., the alphanumeric text information 306 and 404) within the text portion 302, as shown in the example of FIG. 4.

In an alternative embodiment: (a) the keys 304 are implemented by a physical (instead of virtual) keyboard; and (b) by repeatedly selecting (e.g., single tapping) the special purpose key 310, the user 210 causes the system 100 to alternate between a Latin mode and an Arabic mode. In the Latin mode, the keys 304 perform the same functions as discussed hereinabove in connection with FIG. 3, so that the keys 304 are suitable for the user 210 to operate in composing and revising Latin letters and other Latin characters within the text portion 302. By comparison, in the Arabic mode (e.g., which the system 100 may indicate by displaying an "Arabic mode" icon 406 within the text portion 302) of such alternative embodiment, the keys 304 perform the same functions as their phonetically similar keys 402 respectively (as shown in the first and second rows of Tables 1 and 2), so that the keys 304 are suitable for the user 210 to operate in: (a) composing and revising Arabic letters and other Arabic characters within the text portion 302; and (b) in response to the user 210 pressing-and-holding one of the keys 304, causing the display device 102 to display (within the text portion 302) virtual key(s) of related Arabic letter(s) as shown in the third rows of Tables 1 and 2, but without displaying the other keys 402 to the user 210. In that manner: (a) by alternating between the Latin mode and the Arabic mode, the keys 304 and the displayed virtual key(s) of such related Arabic letter(s) are suitable for the user 210 to operate in composing and revising multilingual combinations of Latin letters, other Latin characters, Arabic letters and other Arabic characters; and (b) in response to such operation, the processor 202 causes the display device 102 to simultaneously display such multilingual combinations within the text portion 302.

Figure 5:
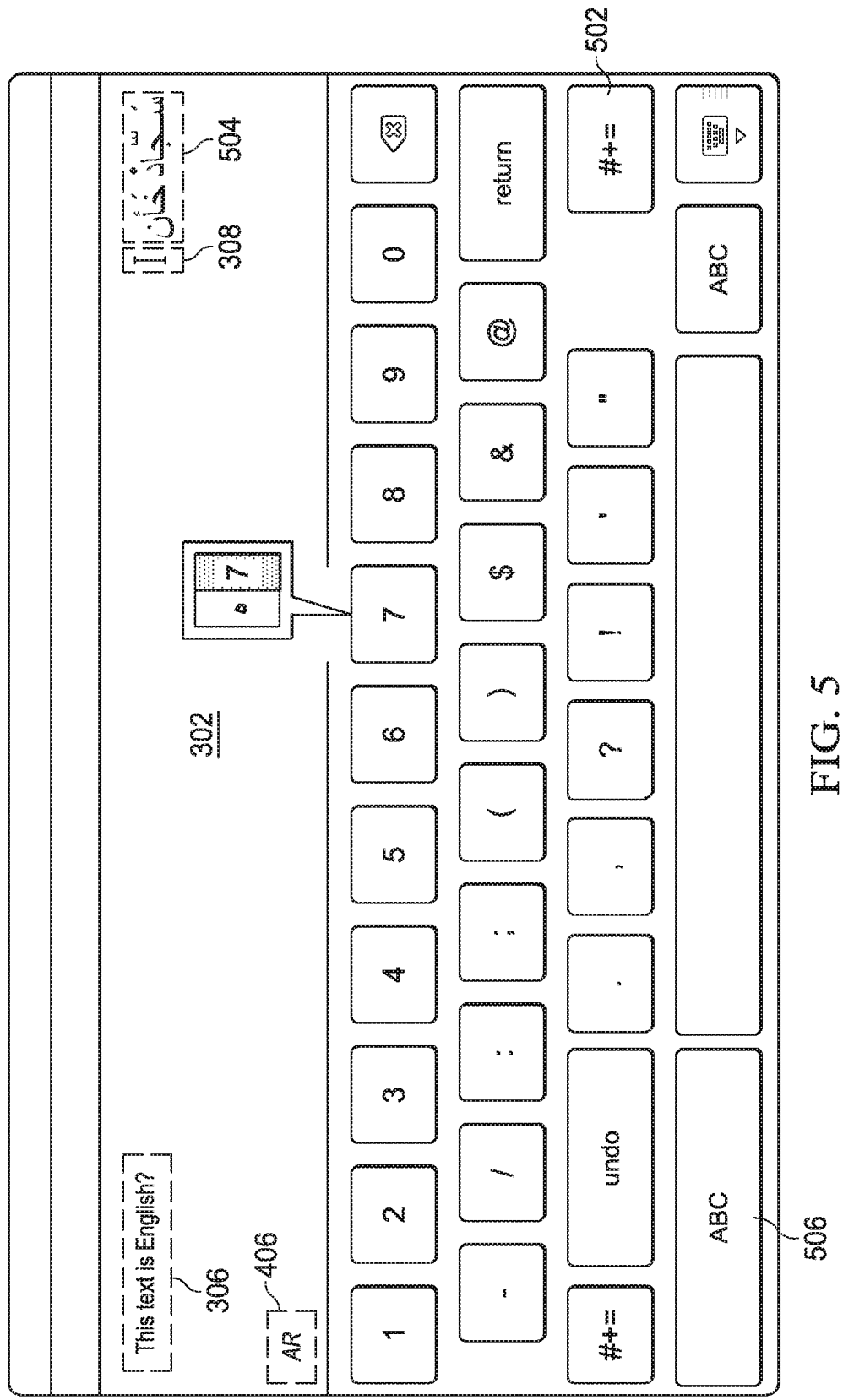
FIG. 5 is a diagram of a third example screen that is displayed by the display device of the system of FIG. 1.

FIG. 5 is a diagram of a third example screen that is displayed by the display device 102. In the example of FIG. 5: (a) the user 210 has selected (e.g., single tapped) a numeric mode key 408 within the keys 402 (FIG. 4) on the display device 102; and (b) in response thereto, the processor 202 has caused the display device 102 to display an alternative set of keys (e.g., an alternative virtual keyboard) 502 associated with the selected text portion 302 for viewing (on the display device 102) by the user 210, instead of displaying the set of keys 402. The keys 502 are suitable for the user 210 to operate in composing and revising alphanumeric text information 504 at the location of the cursor 308 within the text portion 302. In this example, the alphanumeric text information 504 includes Arabic letters and other Arabic characters (composed in a right-to-left order and revised by the user 210 suitably operating the keys 402 and 502), while the alphanumeric text information 306 includes Latin letters and other Latin characters (composed in a left-to-right order and revised by the user 210 suitably operating the keys 304).

As shown in the Table 3, the system 100 associates numbers (within the keys 502) with diacritics.

TABLE 3

Mapping between Numbers and Diacritics

| 1 | 2 | 3 | 4 | 5 | 6 | 7 | 8 | 9 | 0 |
|---|---|---|---|---|---|---|---|---|---|
| ﹷ | ﹻ | ﹾ | ﹽ | ﹼ | ﹹ | ◌ | ﹿ | ﹴ | ﹽ |

In response to the user 210 pressing-and-holding one of the numbers (within the keys 502), the processor 202 causes the display device 102 to display virtual key(s) of such associated diacritic(s), so that such display is viewable by the user 210 with more efficiency and comfort (instead of displaying all of the diacritics from the second row of Table 3 simultaneously with one another). In the example of FIG. 5: (a) the user 210 has pressed-and-held the number 7 key on the display device 102; and (b) in response thereto, the processor 202 has caused the display device 102 to display (adjacent to the number 7 key) a virtual key of the associated diacritic ◌ for viewing (on the display device 102) by the user 210. The user 210 is able to select (e.g., single tap) any of the keys 502, including any displayed virtual key(s) of such associated diacritic(s). In response to such selection (by the user 210) of a diacritic's displayed virtual key, the processor 202 causes the display device 102 to display such diacritic at the location of the Arabic letter that is adjacent a right side of the cursor 308 within the text portion 302.

In response to the user 210 selecting (e.g., single tapping) an alphabetic mode key 506 within the keys 502 on the display device 102, the processor 202 causes the display device 102 to again display the set of keys 402 (FIG. 4) for viewing (on the display device 102) by the user 210, instead of displaying the set of keys 502. Accordingly, by repeatedly selecting the numeric mode key 408 (FIG. 4) and the alphabetic mode key 506 (FIG. 5), the user 210 causes the display device 102 to alternate between displaying either the set of keys 402 or the set of keys 502 for viewing (on the display device 102) by the user 210, while continuing to display (within the text portion 302) the alphanumeric text information 306 and 504 irrespective of such repeated selection. In that manner: (a) by alternating between the sets of keys 402 and 502, those keys are suitable for the user 210 to operate in composing and revising combinations of Arabic letters, diacritics and other characters; and (b) in response to such operation, the processor 202 causes the display device 102 to simultaneously display such combinations (e.g., the alphanumeric text information 504) within the text portion 302, as shown in the example of FIG. 5.

In an alternative embodiment: (a) the keys 502, in combination with the keys 304 (FIG. 3), are implemented by a physical (instead of virtual) keyboard; and (b) by repeatedly selecting (e.g., single tapping) the special purpose key 310 (FIG. 3), the user 210 causes the system 100 to alternate between a Latin mode and an Arabic mode. In the Latin mode, the keys 502 perform their conventional functions, so that the keys 502 are suitable for the user 210 to operate in composing and revising numbers and other characters within the text portion 302. By comparison, in the Arabic mode (e.g., which the system 100 may indicate by displaying the "Arabic mode" icon 406 within the text portion 302) of such alternative embodiment, numbered ones of the keys 502 perform their conventional functions and the diacritic functions as shown in Table 3, so that such numbered ones of the keys 502 are suitable for the user 210 to operate in: (a) composing and revising diacritics at Arabic letters within the text portion 302; and (b) in response to the user 210 pressing-and-holding a numbered one of the keys 502, causing the display device 102 to display (within the text portion 302) virtual key(s) of associated diacritic(s) as shown in Table 3. In that manner: (a) by alternating between the Latin mode and the Arabic mode, the keys 502 and the displayed virtual key(s) of such associated diacritic(s) are suitable for the user 210 to operate in composing and revising combinations of numbers, diacritics at Arabic letters, and other characters; and (b) in response to such operation, the processor 202 causes the display device 102 to simultaneously display such combinations within the text portion 302.

Figure 6:
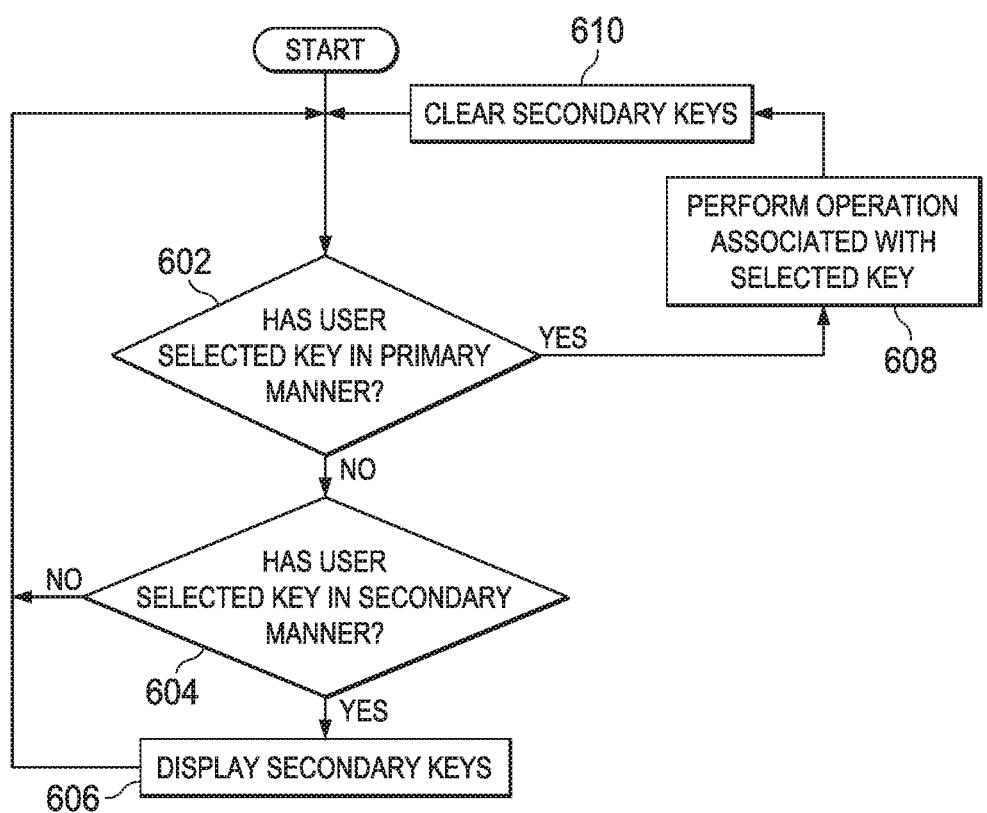
FIG. 6 is a flowchart of an operation of the system of FIG. 1.

FIG. 6 is a flowchart of an operation of the system 100. Such operation is discussed hereinabove in connection with FIGS. 4 and 5. At a step 602, the system 100 determines whether the user 210 has selected a key in a primary manner (e.g., selecting a key by single tapping such key).

In response to the system 100 determining (at the step 602) that the user 210 has not selected a key in the primary manner, the operation continues from the step 602 to a step 604. At the step 604, the system 100 determines whether the user 210 has selected a key in a secondary manner (e.g., selecting a key by pressing-and-holding such key). In response to the system 100 determining (at the step 604) that the user 210 has not selected a key in the secondary manner, the operation returns from the step 604 to the step 602.

Conversely, in response to the system 100 determining (at the step 604) that the user 210 has selected a key in the secondary manner, the operation continues from the step 604 to a step 606. At the step 606, the processor 202 causes the display device 102 to display one or more secondary keys (if any) that are associated with the selected key. After the step 606, the operation returns to the step 602.

In a first example of the step 606, as discussed hereinabove in connection with FIG. 4, if the selected key is an Arabic letter (within the keys 402) that the system 100 associates with one or more related Arabic letters (as shown in the third rows of Tables 1 and 2), then such one or more secondary keys would be virtual key(s) of such related Arabic letter(s). In a second example of the step 606, as discussed hereinabove in connection with FIG. 5, if the selected key is a number (within the keys 502), then such one or more secondary keys would be virtual key(s) of diacritic(s) that the system 100 associates with such number (as shown in Table 3).

Referring again to the step 602, in response to the system 100 determining that the user 210 has selected a key (e.g., any of the displayed secondary keys) in the primary manner, the operation continues from the step 602 to a step 608. At the step 608, the system 100 performs a respective operation associated with the selected key. After the step 608, the operation continues to a step 610, at which the processor 202 causes the display device 102 to clear (e.g., erase) its display of secondary keys (if any), which may have been displayed by the display device 102 as a result of the step 606. After the step 610, the operation returns to the step 602.

In a first example of the step 608, as discussed hereinabove in connection with FIG. 4, if the selected key is an Arabic letter (as shown in the second or third rows of Tables 1 and 2), then the processor 202 causes the display device 102 to display the selected key's Arabic letter at the location of the cursor 308 within the text portion 302, so that such displaying is the respective operation associated with the selected key. In a second example of the step 608, as discussed hereinabove in connection with FIG. 5, if the selected key is a diacritic (as shown in the second row of Table 3), then the processor 202 causes the display device 102 to display such diacritic at the location of the Arabic letter that is adjacent a right side of the cursor 308 within the text portion 302, so that such displaying is the respective operation associated with the selected key.

In the illustrative embodiments, a computer program product is an article of manufacture that has: (a) a computer-readable medium; and (b) a computer-readable program that is stored on such medium. Such program is processable by an instruction execution apparatus (e.g., system or device) for causing the apparatus to perform various operations discussed hereinabove (e.g., discussed in connection with a block diagram). For example, in response to processing (e.g., executing) such program's instructions, the apparatus (e.g., programmable information handling system) performs various operations discussed hereinabove. Accordingly, such operations are computer-implemented.

Such program (e.g., software, firmware, and/or microcode) is written in one or more programming languages, such as: an object-oriented programming language (e.g., C++); a procedural programming language (e.g., C); and/or any suitable combination thereof. In a first example, the computer-readable medium is a computer-readable storage medium. In a second example, the computer-readable medium is a computer-readable signal medium.

A computer-readable storage medium includes any system, device and/or other non-transitory tangible apparatus (e.g., electronic, magnetic, optical, electromagnetic, infrared, semiconductor, and/or any suitable combination thereof) that is suitable for storing a program, so that such program is processable by an instruction execution apparatus for causing the apparatus to perform various operations discussed hereinabove. Examples of a computer-readable storage medium include, but are not limited to: an electrical connection having one or more wires; a portable computer diskette; a hard disk; a random access memory ("RAM"); a read-only memory ("ROM"); an erasable programmable read-only memory ("EPROM" or flash memory); an optical fiber; a portable compact disc read-only memory ("CD-ROM"); an optical storage device; a magnetic storage device; and/or any suitable combination thereof.

A computer-readable signal medium includes any computer-readable medium (other than a computer-readable storage medium) that is suitable for communicating (e.g., propagating or transmitting) a program, so that such program is processable by an instruction execution apparatus for causing the apparatus to perform various operations discussed hereinabove. In one example, a computer-readable signal medium includes a data signal having computer-readable program code embodied therein (e.g., in baseband or as part of a carrier wave), which is communicated (e.g., electronically, electromagnetically, and/or optically) via wireline, wireless, optical fiber cable, and/or any suitable combination thereof.

Modifications are possible in the described embodiments, and other embodiments are possible, within the scope of the claims.

What is claimed is:

1. A method performed by at least one device for operating a keyboard, the method comprising:

in response to a user selecting a first key on the keyboard in a first manner, displaying a first alphanumeric character at a first location on a display device, wherein the keyboard is in a first mode associated with a first set of characters of a first language;

in response to the user selecting a mode selection key, selecting a second mode for the keyboard, wherein the second mode is associated with a second set of characters of a second language, wherein a first character of the first set of characters is associated with the first key, wherein a second character of the second set of characters is associated with the first key, and wherein the first character is associated with the second character based on a phonetic pronunciation of the first character and the second character;

in response to the user selecting a second key on the keyboard in the second mode in the first manner, displaying a second alphanumeric character at a second location on the display device, wherein the first alphanumeric character and the second alphanumeric character are a multilingual combination displayed simultaneously;

in response to the user selecting the second key on the keyboard in a second manner, displaying a first virtual key of a first diacritic on the display device at the second location;

in response to the user selecting a numeric mode key on the keyboard, displaying a first numeric key in the first language;

in response to the user selecting the first numeric key in the second manner, displaying a second diacritic associated with the first numeric key, wherein the second diacritic includes a second virtual key displaying a numerical character of the second language; and in response to the user selecting the second virtual key, displaying the numerical character of the second language at a cursor location in the second location on the display device.

2. The method of claim 1, wherein the keyboard is a virtual keyboard.

3. The method of claim 1, wherein the first manner is a single tap.

4. The method of claim 1, wherein the second manner is a press-and-hold.

5. The method of claim 1, wherein the first alphanumeric character is a Latin numeric character.

6. The method of claim 1, wherein the location of the second alphanumeric character on the display device is indicated by a cursor that is positioned in response to a command from the user.

7. The method of claim 1, wherein the first set of characters are Latin letters.

8. The method of claim 7, wherein the second set of characters are Arabic letters.

9. A system for operating a keyboard, the system comprising:

a combination of electronic circuitry components for:

in response to a user selecting a first key on the keyboard in a first manner, displaying a first alphanumeric character at a first location on a display device, wherein the keyboard is in a first mode associated with a first set of characters of a first language;

in response to the user selecting a mode selection key, selecting a second mode for the keyboard, wherein the second mode is associated with a second set of characters of a second language, wherein a first character of the first set of characters is associated with the first key, wherein a second character of the second set of characters is associated with the first key, and wherein the first character is associated with the second character based on a phonetic pronunciation of the first character and the second character;

in response to the user selecting a second key on the keyboard in the second mode in the first manner, displaying a second alphanumeric character at a second location on the display device, wherein the first alphanumeric character and the second alphanumeric character are a multilingual combination displayed simultaneously;

in response to the user selecting the second key on the keyboard in a second manner, displaying a first virtual key of a first diacritic on the display device at the second location;

in response to the user selecting a numeric mode key on the keyboard, displaying a first numeric key in the first language;

in response to the user selecting the first numeric key in the second manner, displaying a second diacritic associated with the first numeric key, wherein the second diacritic includes a second virtual key displaying a numerical character of the second language; and in response to the user selecting the second virtual key, displaying the numerical character of the second language at a cursor location in the second location on the display device.

10. The system of claim 9, wherein the keyboard is a virtual keyboard.

11. The system of claim 9, wherein the first manner is a single tap.

12. The system of claim 9, wherein the second manner is a press- and-hold.

13. The system of claim 9, wherein the first alphanumeric character is a Latin numeric character.

14. The system of claim 9, wherein the location of the second alphanumeric character on the display device is indicated by a cursor that is positioned in response to a command from the user.

15. The system of claim 9, wherein the first set of characters are Latin letters.

16. The system of claim 15, wherein the second set of characters are Arabic letters.

17. A non-transitory computer-readable medium storing instructions that are processable by an instruction execution apparatus for causing the apparatus to perform a method comprising:

in response to a user selecting a first key on a keyboard in a first manner, displaying a first alphanumeric character at a first location on a display device, wherein the keyboard is in a first mode associated with a first set of characters of a first language;

in response to the user selecting a mode selection key, selecting a second mode for the keyboard, wherein the second mode is associated with a second set of characters of a second language, wherein a first character of the first set of characters is associated with the first key, wherein a second character of the second set of characters is associated with the first key, and wherein the first character is associated with the second character based on a phonetic pronunciation of the first character and the second character;

in response to the user selecting a second key on the keyboard in the second mode in the first manner, displaying a second alphanumeric character at a second location on the display device, wherein the first alphanumeric character and the second alphanumeric character are a multilingual combination displayed simultaneously;

in response to the user selecting the second key on the keyboard in a second manner, displaying a first virtual key of a first diacritic on the display device at the second location;

in response to the user selecting a numeric mode key on the keyboard, displaying a first numeric key in the first language;

in response to the user selecting the first numeric key in the second manner, displaying a second diacritic associated with the first numeric key, wherein the second diacritic includes a second virtual key displaying a numerical character of the second language; and in response to the user selecting the second virtual key, displaying the numerical character of the second language at a cursor location in the second location on the display device.

18. The non-transitory computer-readable medium of claim 17, wherein the keyboard is a virtual keyboard.

19. The non-transitory computer-readable medium of claim 17. wherein the first manner is a single tap.

20. The non-transitory computer-readable medium of claim 17. wherein the second manner is a press-and-hold.

21. The non-transitory computer-readable medium of claim 17, wherein the first alphanumeric character is a Latin numeric character.

22. The non-transitory computer-readable medium of claim 17. wherein the location of the second alphanumeric character on the display device is indicated by a cursor that is positioned in response to a command from the user.

23. The non-transitory computer-readable medium of claim 17. wherein the first set of characters are Latin letters.

24. The non-transitory computer-readable medium of claim 23, wherein the second set of characters are Arabic letters.

25. A method performed by at least one device for operating a keyboard, the method comprising:

in response to a user selecting a first key on the keyboard in a first manner, displaying a first alphanumeric character at a first location on a display device, wherein the keyboard is in a first mode associated with a first set of characters of a first language;

in response to the user selecting a mode selection key, selecting a second mode for the keyboard, wherein the second mode is associated with a second set of characters of a second language, wherein a first character of the first set of characters is associated with the first key, wherein a second character of the second set of characters is associated with the first key, and wherein the first character is associated with the second character based on a phonetic pronunciation of the first character and the second character;

in response to the user selecting a second key on the keyboard in the second mode in the first manner, displaying a second alphanumeric character at a second location on the display device, wherein the first alphanumeric character and the second alphanumeric character are a multilingual combination displayed simultaneously;

in response to the user selecting the second key on the keyboard in a second manner, displaying a first virtual key a first diacritic on the display device at the second location;

in response to the user selecting a numeric mode key on the keyboard, displaying a first numeric key in the first language;

in response to the user selecting the first numeric key in the second manner, displaying a second diacritic associated with the first numeric key, wherein the second diacritic includes a second virtual key displaying a numerical character of the second language; and in response to the user selecting the second virtual key, displaying the numerical character of the second language at a cursor location in the second location on the display device.

26. The method of claim 25, wherein the keyboard is a virtual keyboard.

27. The method of claim 25, wherein the first manner is a single tap.

* * * * *